(12) United States Patent
Cheng et al.

(10) Patent No.: US 11,589,699 B2
(45) Date of Patent: Feb. 28, 2023

(54) COOKWARE WITH METAL MESH EMBEDDED IN THE BASE

(71) Applicant: Meyer Intellectual Properties Limited, Kowloon (HK)

(72) Inventors: Stanley Kin Sui Cheng, Hillsborough, CA (US); Roberto Tarenga, Milan (IT)

(73) Assignee: Meyer Intellectual Properties Limited

( * ) Notice: Subject to any disclaimer, the term of this patent is extended or adjusted under 35 U.S.C. 154(b) by 130 days.

(21) Appl. No.: 17/184,107

(22) Filed: Feb. 24, 2021

(65) Prior Publication Data

US 2021/0267403 A1 Sep. 2, 2021

Related U.S. Application Data

(60) Provisional application No. 62/980,719, filed on Feb. 24, 2020.

(51) Int. Cl.
| | | |
|---|---|---|
| *A47J 27/00* | (2006.01) | |
| *A47J 36/02* | (2006.01) | |
| *A47J 36/24* | (2006.01) | |
| *H05B 6/12* | (2006.01) | |

(52) U.S. Cl.
CPC .............. *A47J 27/002* (2013.01); *A47J 36/02* (2013.01); *A47J 36/2483* (2013.01); *H05B 6/12* (2013.01)

(58) Field of Classification Search
None
See application file for complete search history.

(56) References Cited

U.S. PATENT DOCUMENTS

| 5,506,062 A * | 4/1996 | Flammang ............. B21K 25/00 |
| | | 428/614 |
| 2015/0090725 A1* | 4/2015 | Cheng ................... A47J 27/002 |
| | | 220/573.1 |

FOREIGN PATENT DOCUMENTS

| DE | 4429912 A1 * | 10/1995 | ............. A47J 36/02 |
| EP | 987071 A1 * | 3/2000 | ............. B21D 39/03 |
| WO | WO-9606552 A1 * | 3/1996 | ............. A47J 27/022 |
| WO | WO-0044201 A1 * | 7/2000 | ............. A47J 36/02 |
| WO | 2013/142151 A1 | 9/2013 | |

OTHER PUBLICATIONS

Written Opinion of the International Searching Authority dated Jun. 2, 2021 in connection with PCT Application No. PCT/US2021/019418.
International Search Report dated Jun. 2, 2021 in connection with PCT Application No. PCT/US2021/019418.

* cited by examiner

*Primary Examiner* — John J Norton
(74) *Attorney, Agent, or Firm* — Akerman LLP

(57) ABSTRACT

Cookware has both as copper and a stainless steel mesh embedded in the exterior facing surface of the bottom of the base. The embedding process work hardens the bottom of an aluminum cooper vessel. A ferromagnetic stainless steel is embedded into the cooper mesh, forming portion of the exterior bottom surface of the cookware to render the cookware compatible with induction cooking heat sources.

12 Claims, 14 Drawing Sheets

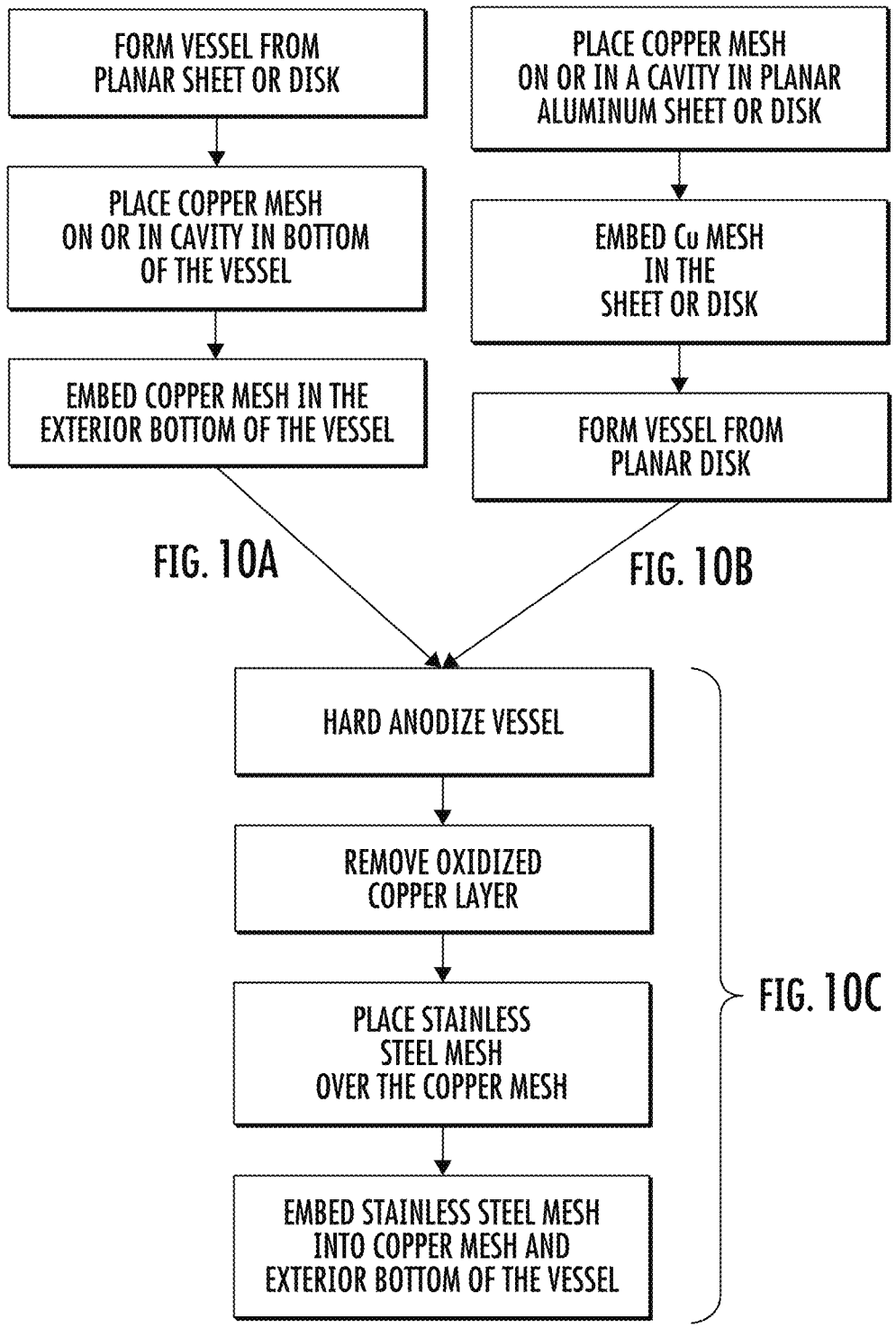

COOKWARE WITH METAL MESH EMBEDDED IN THE BASE

CROSS REFERENCE TO RELATED APPLICATIONS

This patent application claims the benefit of the filing date under 35 U.S.C. § 119(e) to U.S. Provisional Patent Application No. 62/980,719, filed on Feb. 24, 2020, the contents of which are hereby incorporated by reference in their entirety.

BACKGROUND OF INVENTION

The present invention relates to a cookware article, and in particular to pots and pans that are formed substantially of aluminum, aluminum alloys, both of which are optionally anodized to form a hard alumina or aluminum oxide surface.

While many forms of cookware vessels utilize a combination of metals, anodized aluminum cookware is generally formed entirely of aluminum. Additional metals, such as magnetic ferrous materials, enable the use of the anodized cookware with induction heating sources, which rather than providing a hot surface or flame to transfer heat to the vessel, directly heat the vessel by the transfer of energy in the electromagnetic radiation. The electromagnetic radiation is generated by conductive coils in the induction heating source, which upon entering the skin layer of metal induce eddy currents that cause resistive heating in the cookware vessels bottom.

While copper is much more thermally conductive than aluminum, it's incorporation into aluminum requires sophisticated fabrication of the sheet stock used to form the cookware vessel.

Anodized aluminum cookware, although it generally requires a bonded base of magnetic metal for induction cooking, has the benefit of very hard aluminum oxide exterior surfaces formed during anodizing to provide non marring finishes. Although other metals can be used in such cookware to provide induction capability, the aggressiveness of the acidic anodizing solution used to create the aluminum oxide coating usually necessitates additional steps of masking the additional metals layers that would be bonded to the base.

It is therefore a first object of the present invention to provide anodized cookware, which benefit substantially from the harness and durability of the aluminum oxide on the interior and exterior surfaces that incorporates additional metals that provide other benefits.

More particularly, it is an objective to provide for copper layers to increase lateral heat conduction so that a cookware vessel heats evenly across the bottom, as well as to provide magnetic, that is ferro-magnetic alloys, such as magnetic stainless steel, such that the cookware can be heat on an induction range.

It is a further objective of the invention to provide one or several of these benefits with a minimum additional manufacturing steps and costs.

SUMMARY OF INVENTION

In the present invention, the first object is achieved by providing an article of cookware, comprising a substantially horizontal bottom, having an interior bottom surface and an exterior bottom surface on the side opposing the interior bottom surface, substantially upright sidewall extending upward from and encircling said bottom to form a fluid retaining interior region, wherein a A second aspect of the invention is characterized in that the Another aspect of the invention is characterized in that the metal mesh is stainless steel and is partially exposed on the exterior bottom surface.

The above and other objects, effects, features, and advantages of the present invention will become more apparent from the following description of the embodiments thereof taken in conjunction with the accompanying drawings.

BRIEF DESCRIPTION OF DRAWINGS

FIGS. 10A-10B illustrate alternative sets of steps in a portion of the flow chart that includes FIG. 10C.

FIG. 12B is a schematic elevation view of FIG. 12A prior to the step of embedding, whereas

DETAILED DESCRIPTION

Figure 1:
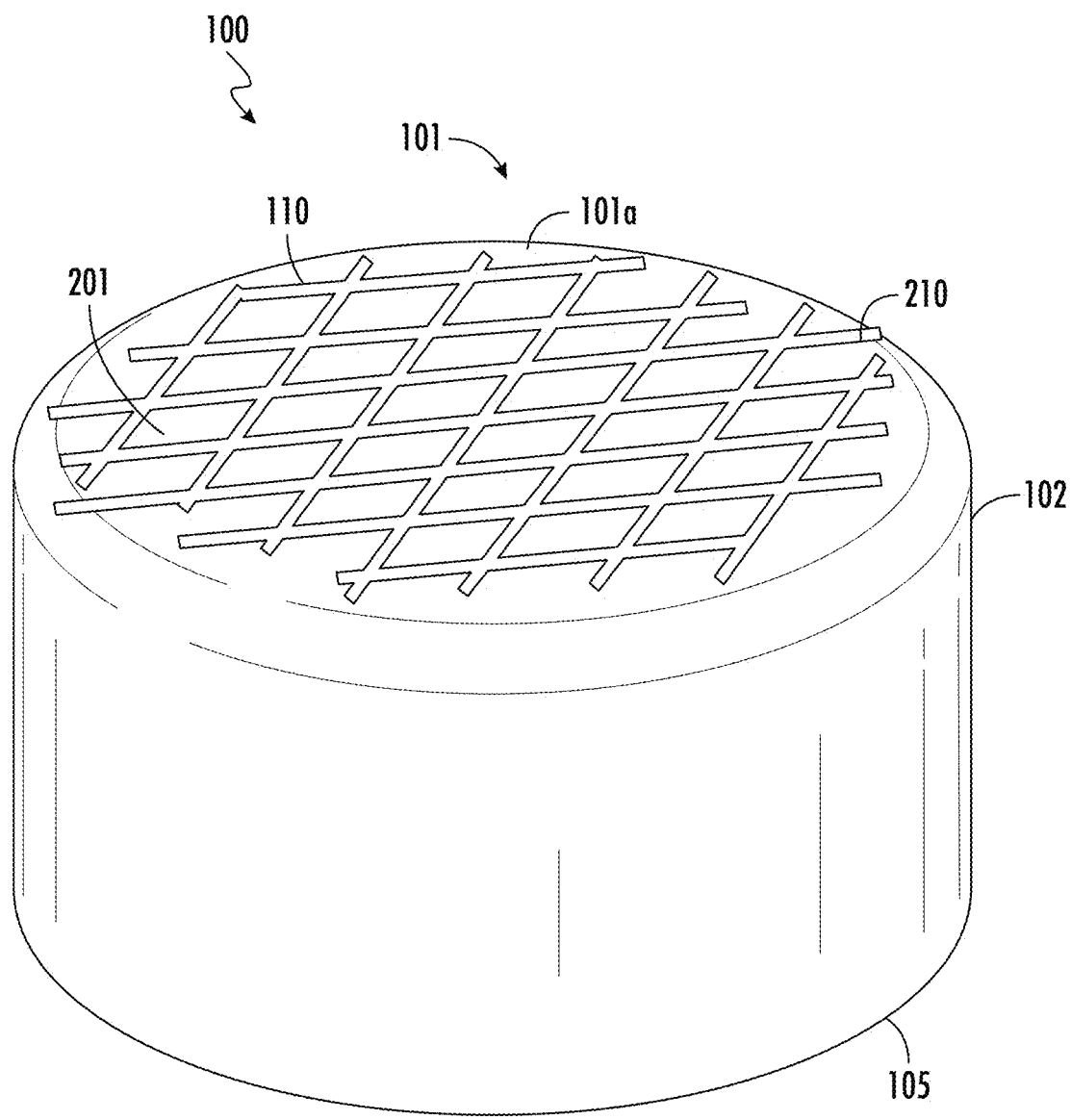
FIG. 1 is a perspective view of an inverted cookware article showing a metal mesh embedded into the exterior bottom cooking surface.

Referring to FIGS. 1 through 14 wherein like reference numerals refer to like components in the various views, there is illustrated therein a new and improved anodized cookware vessel having embedded metal mesh, generally denominated 100 herein.

In accordance with the present invention, as illustrated in FIGS. 1, 5B-D, 7B, 9B and 13, a cookware article or vessel 100 has a base or bottom portion 101 with the exterior bottom surface 101a that during use is facing downward and the opposing bottom interior surface 101b facing upward for supporting foodstuffs in cooking. Surrounding walls 102 extend substantially upright from the perimeter of the interior bottom surface 101b to provide a vessel capable of holding a fluid. The surrounding walls 102 terminate at a rim 105. The interior surface of the surrounding wall is designated 102b while the exterior surface of the surrounding wall is designated 102a. A first metal mesh 110 is embedded in the exterior bottom surface 101a. The cookware vessel 100 may be formed substantially of aluminum, including alloys of aluminum, and may have an anodized exterior surface consisting substantially of aluminum oxide. The interior bottom surface 101b can be a layer of a different metal, such as a cladding layer or a non-stick coating added after the forming processes. The cookware article 100 may also be formed of clad metal for example to provide a stainless steel layer as the interior bottom surface 101b, while the exterior bottom surface 101a is aluminum or an alloy or aluminum.

In the preferred embodiments a second metal mesh 210 is also embedded into the exterior bottom surface 101a cookware vessel 100, which may penetrate and deforms the first metal mesh 110. It is desired that the second mesh 210 is capable of deforming both the exterior bottom surface 101a and the first mesh 110. This ensures the first mesh 110 and second mesh 210 will be intimately linked and entangled.

When the first 110 or second mesh 210 is a ferromagnetic alloy, it renders the cookware vessel 100 capable of induction cooking, even if the base metal that forms the cookware vessel, such as aluminum or non-ferromagnetic steel or stainless steel is not. The ferromagnetic alloy should be at least in part on the outer exterior surface and not be covered by other layers of conductive material to be an effective receiver of energy from the induction coils.

Aluminum is a good conductor of heat upward from an embedded mesh, such as ferromagnetic stainless steel that is heated by eddy currents in induction ranges. However, it is also desirable to spread heat laterally, as induction burners typically have smaller coils with a diameter much smaller than the cookware vessel 100 diameter. If the cookware vessel 100 heats primary over the induction coil, the center may be hot before the edges of the interior bottom 101b closer to the sidewall 102.

It has been discovered that it is possible to first embed a copper mesh 110 into the exterior bottom surface 101a of an aluminum or aluminum alloy cookware vessel to provide improved lateral conductive of heat. It has also been discovered that a mesh of ferromagnetic stainless steel 210 can then be embedded into both exterior bottom surface 101a of an aluminum or aluminum alloy cookware and the copper mesh 110 that is embedded therein.

As copper and many alloys thereof are harder than aluminum alloys, on embedding the copper mesh 110 as a first mesh in an aluminum vessel the outer layer of the aluminum at the surface 101a will be deformed and forced through the openings 101 in the copper mesh 110. Likewise, stainless steel is harder and stronger than moist copper alloys, so in a process of embedding a stainless steel mesh, the copper mesh and the aluminum metal in the base 101 may also deform.

As the second or ferromagnetic stainless steel mesh 210 is then embedded into the copper mesh 110, heat is generated in the ferromagnetic stainless steel mesh 210 by induced eddy current from the induction coils, is believed to more efficiently diffuse laterally within the copper mesh 110 than the aluminum in the bottom 110, due to the intimate and multiple areas of contact formed in the embedding processes.

As compared to other methods of rendering cookware compatible with induction heat source, such as using clad metal and attaching stainless steel plates, less stainless steel and copper metal are required, making the cookware lighter and easier to handle by users.

Figure 2A:
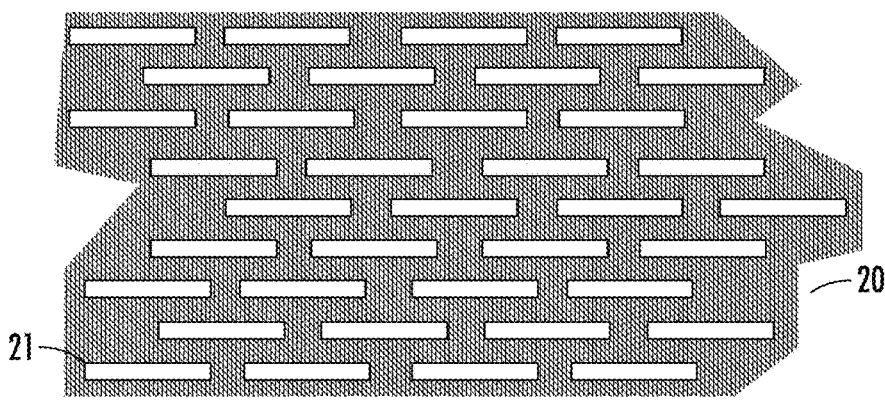
FIGS. 2A-2F are a combination of plan and side elevation views in the steps of forming a metal mesh that can be embedded into the exterior bottom cooking surface of a cookware article.
Figures 2B, 2D:
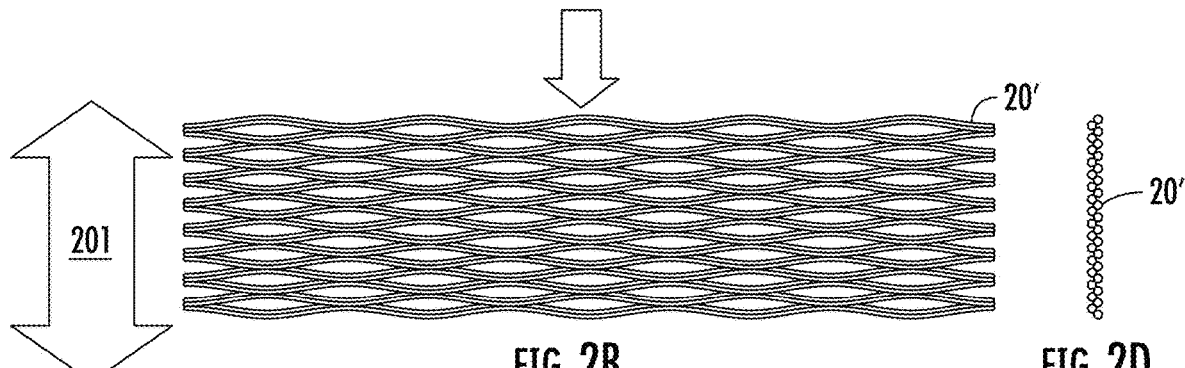
Figure 2C:
Figures 2E, 2F:
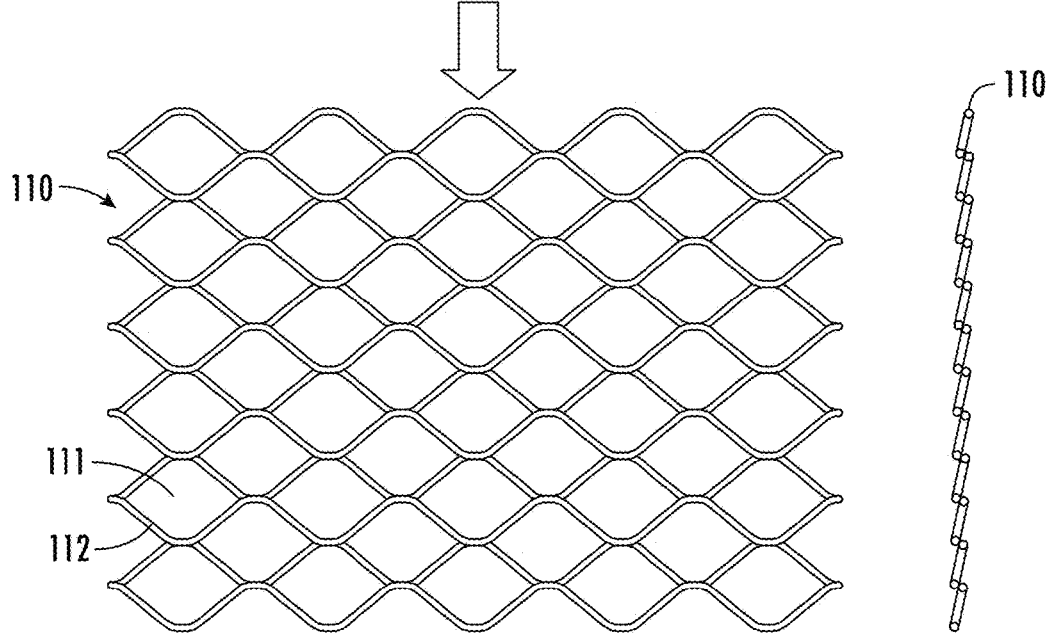

FIGS. 2A through F, schematically illustrate that either metal mesh 110 or 210 is optionally formed by starting with a planar metal sheet 20. As shown in FIG. 2A, an overlapping array of rows of substantially vertical slits 21 are formed in the metal sheet, such as by punching, etching, laser cutting or water jet cutting. In the next step, FIG. 2B, the thus perforated metal mesh 20 is expanded vertically in the direction of arrow 201, which is perpendicular to the slit axis, wherein the slits 21 open up forming rhombohedra with holes 111, as shown in a plan view in FIGS. 2B & 2E. FIG. 2C-D are orthogonal cross-sectional elevations of the mesh 110 or 210 shown in FIG. 2B, whereas FIG. 2F is a cross-sectional elevation of the expanded mesh shown in FIG. 2E in a plan view. However, the various embodiment of the invention are not limited to metal mesh formed by a particular process, as various useful forms of metal mesh can also be fabricated by etching processes, as well as the welding layers of wires at the crossing points.

Independent of the method of forming the mesh 110 or 210, and the shapes of the holes 111 in the mesh 110 (or 211 in mesh 210) it is desirable that the mesh have a particular thickness range and spacing between holes.

Both stainless steel and copper meshes with the thickness of about 0.5 to 1 mm have been successfully embedded in plain aluminum when the mesh openings 111 were from about 3 mm to about 4 mm wide, and the width of the metal between these openings was from about 0.5 mm to about 1 mm, and preferably about 0.75 mm.

It should be noted that ratio of the mesh openings to the mesh thickness is preferably about 3:1 to 6:1 and the width of the openings about 3 to 5 mm.

This ratio seems to result in local work hardening of the aluminum vessel bottom in a similar range of depth to the thickness of the mesh, which is about 0.5 to 5 mm.

Figure 3:
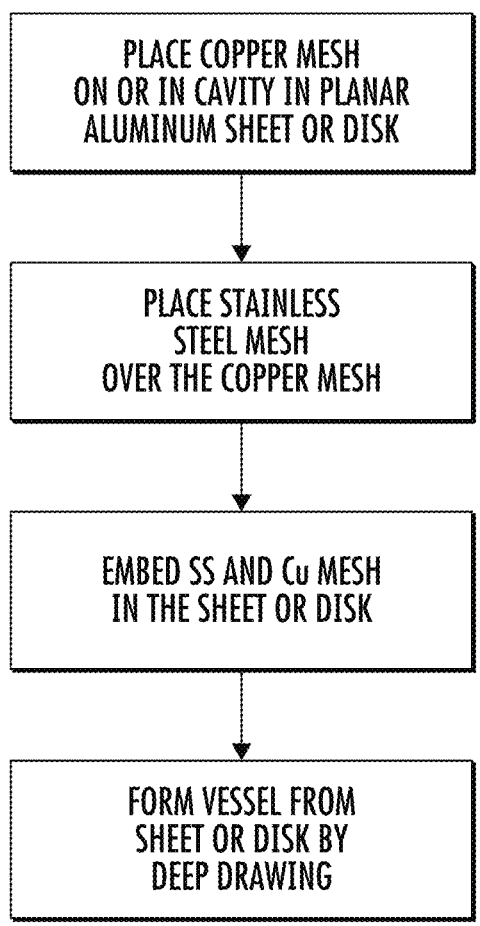
FIG. 3 is a flow chart of a process for forming the cookware article.

FIG. 3 is a flow chart of one method of forming the cookware vessel 100, additional embodiment corresponding to the process flow charts of FIG., a first mesh 110 is embedded in the exterior bottom surface 101a of the cookware vessel 100 by any of the above described methods, and then a second mesh 210 is embedded into the first mesh 110. When the second mesh 210 is harder and has a higher yield strength in compression than the first mesh 110, the first mesh 110 will undergo additional deformation which may also deforms the region below the exterior bottom surface 101a of the cookware vessel 100 in the regions between the first mesh 110 and the second mesh 210. It is believed the reinforcement of the aluminum bottom 110 with the first mesh 110 and second mesh 210 reinforces the vessel bottom to prevent warpage and improve dimensional stability. However, there may be additional benefits in that a very pliable aluminum or aluminum alloy can be used to form the vessel, as for example a well annealed sheet. The well annealed sheet can be more readily deep drawn to complex shapes. However, the steps of embedding each mesh work harder the otherwise soft aluminum or aluminum alloy so that the bottom 110 is more resistant to deformation and warping as the vessel 100 gets heated or cools non uniformly, such as by a user cooling the cookware vessel 100 in cold water or adding cold liquid to the cookware vessel 100 in a stage of cooking.

The FIGS. 4A through 5D illustrate various stages in forming the cookware vessel 100 corresponding to the flow chart of FIG. 3.

Figure 4A:
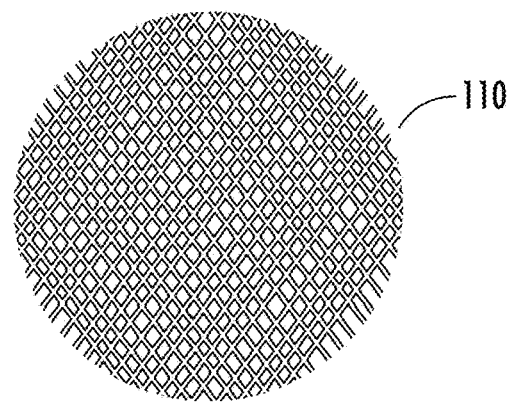
FIGS. 4A-4D schematically illustrate initial steps in methods of attaching or embedding mesh before the cookware vessel is formed corresponding with portions of the flow chart of FIG. 3.
Figure 4B:
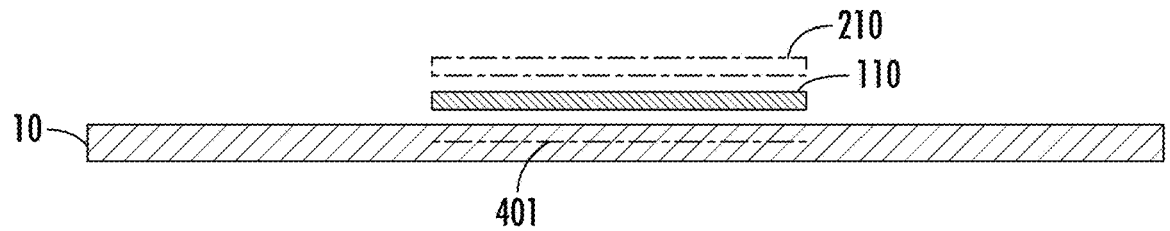
Figure 4C:
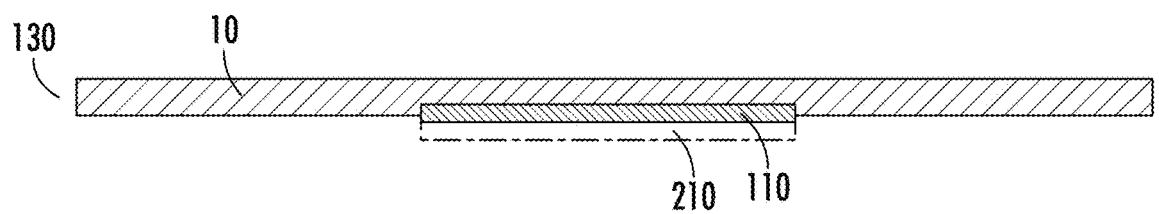
Figure 4D:
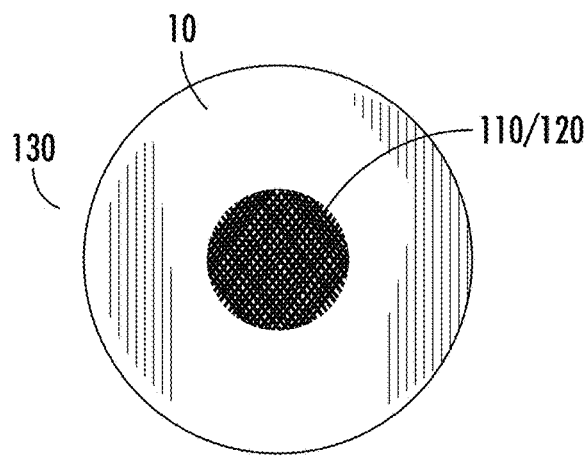

As shown in FIG. 4A-4D, the first 110 and second mesh 210 components can be attached to or embedded in a planar sheet of metal 10 or clad metal before it is deep drawn to form the cookware vessel 100, as illustrated in FIG. 5A-5D. FIG. 4A illustrates either mesh 110 or 210 in plan view. Either or both layers of mesh 110 and/or 210 can be attached to the surface of the metal sheet 10 by processes such as spot welding or placing in a pocket or groove 401 formed or machined in the planar sheet 10. FIG. 4B shows the sheet 10 in a schematic sectional elevation view before attachment of the mesh 110 and/or 210. FIG. 4C shows the metal sheet 10 as a preform 130 mesh 110 and/or 210 attached or embed, and inverted before the steps of deep drawing illustrated in section view in FIG. 5A. The preform 130 is generally in the form of a disk illustrated in a plan view in FIG. 4D.

Figure 5A:
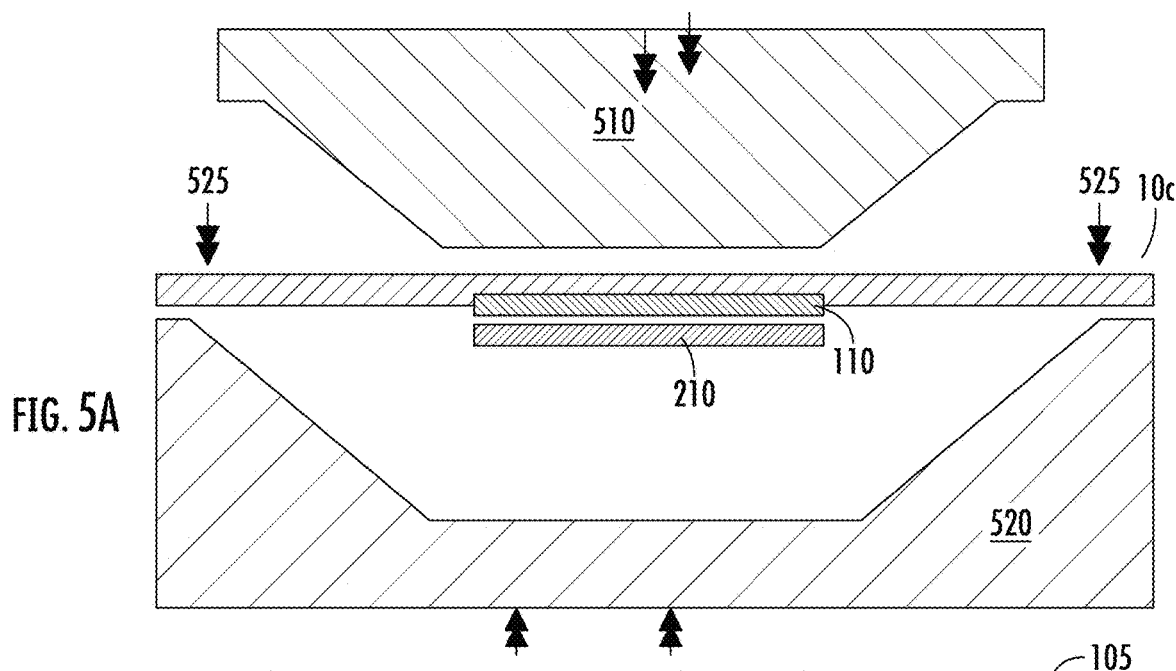
FIGS. 5A-5D schematically illustrate remaining steps in the method of forming the cookware vessel corresponding with the remaining portions of the flow chart of FIG. 3.
Figure 5B:
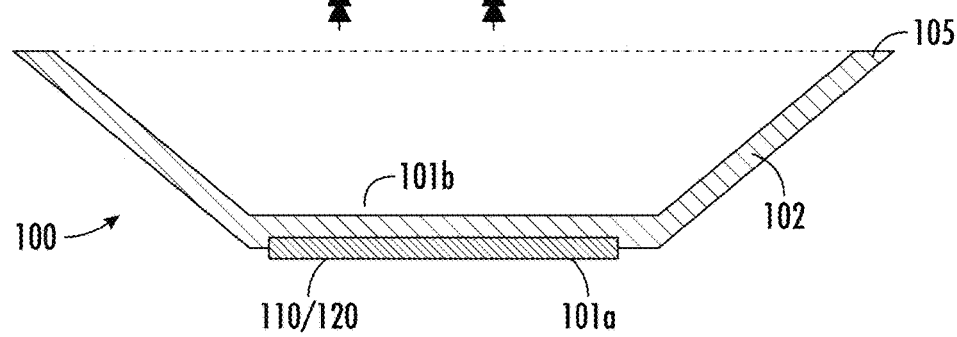
Figure 5C:
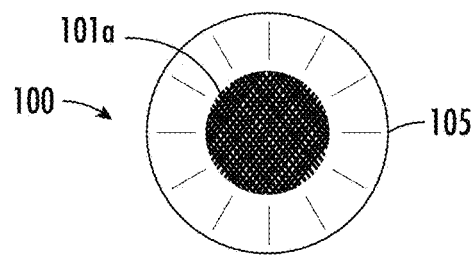
Figure 5D:
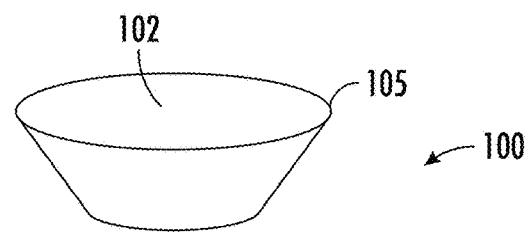

As shown in FIG. 5A, the preform 130 (which may optionally include a clad layer 10*c*) is deep drawn between male 510 and female 520 generally mated forming dies, with the perimeter of preform 130 clamped at arrows 525. The forming dies 610 and 620 can also provide a slight convex shape to the interior bottom 101*b*, as well as optionally shape the rim 105. The deep drawing may be carried out in one or more steps with different dies, as well as dies for ironing to expand or shape only the walls 102. The resulting cookware vessel 100 is shown in section view in FIG. 5B, perspective view in FIG. 5D and bottom plan view in FIG. 5C.

Figure 6:
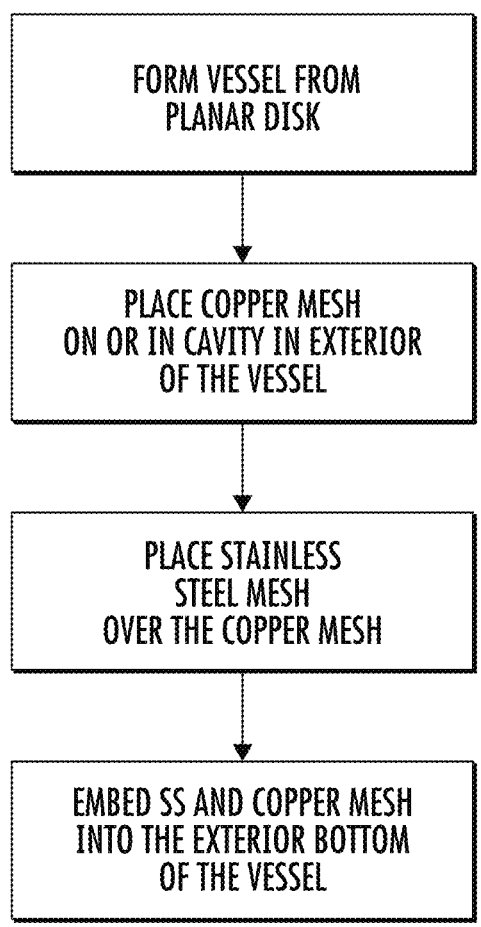
FIG. 6 is a flow chart of an alternative processes for forming the cookware article.
Figure 7A:
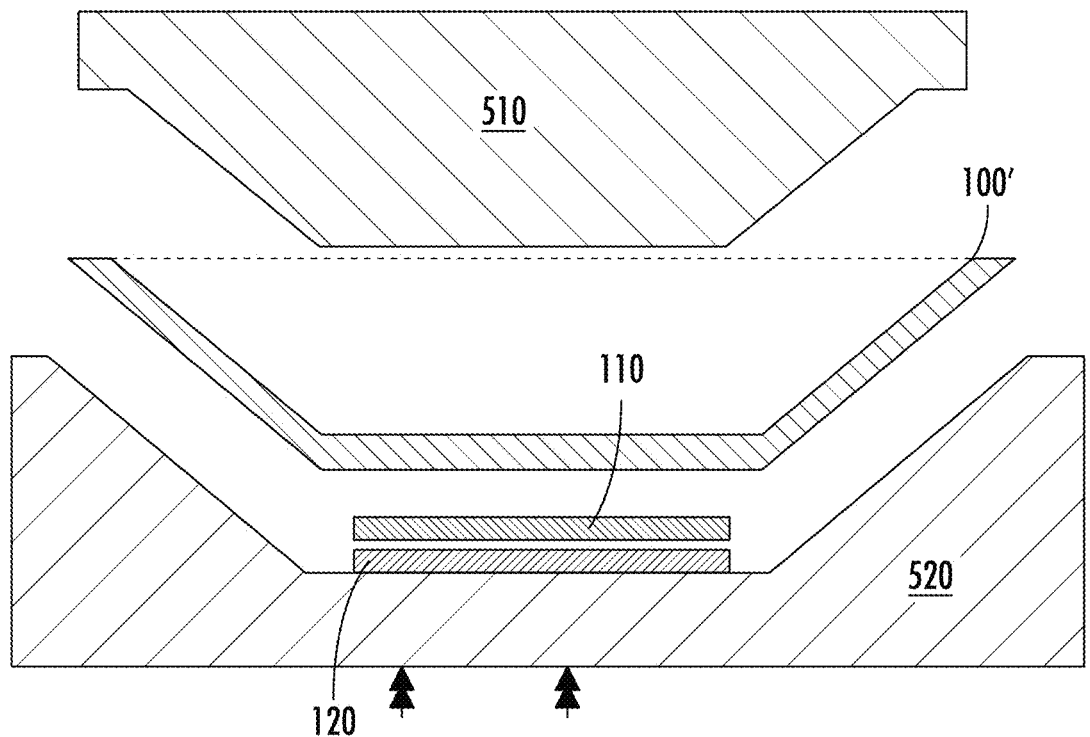
FIGS. 7A and 7B schematically illustrate steps in the flow chart of FIG. 6.
Figure 7B:
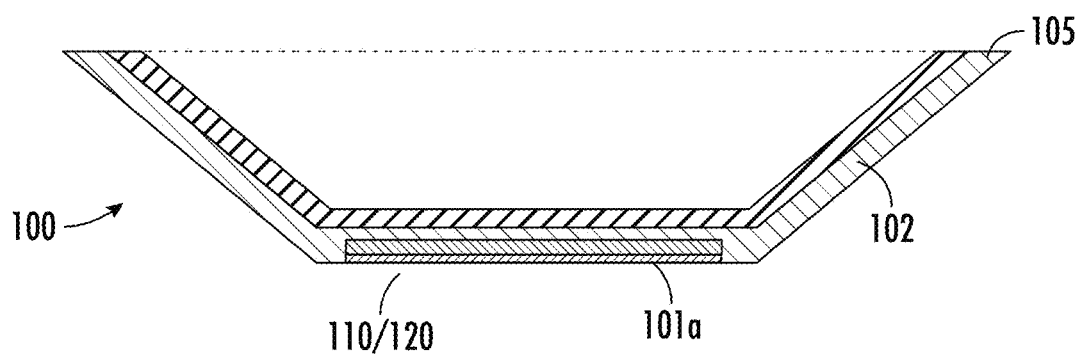

The first 110 and second mesh 210 components can be attached to or embedded in a metal or clad metal after it is deep drawn to form cookware, per the steps in the flow chart of FIG. 6. FIG. 7A shows the use of similar forming dies, with the mesh layers 110 and 210 placed above the lower die 520, for insertion into the bottom of the vessel 100', which can be formed by any process, such as deep drawing, spinning or casting. FIG. 7B shows the completed vessel 100 in section view.

Figure 8:
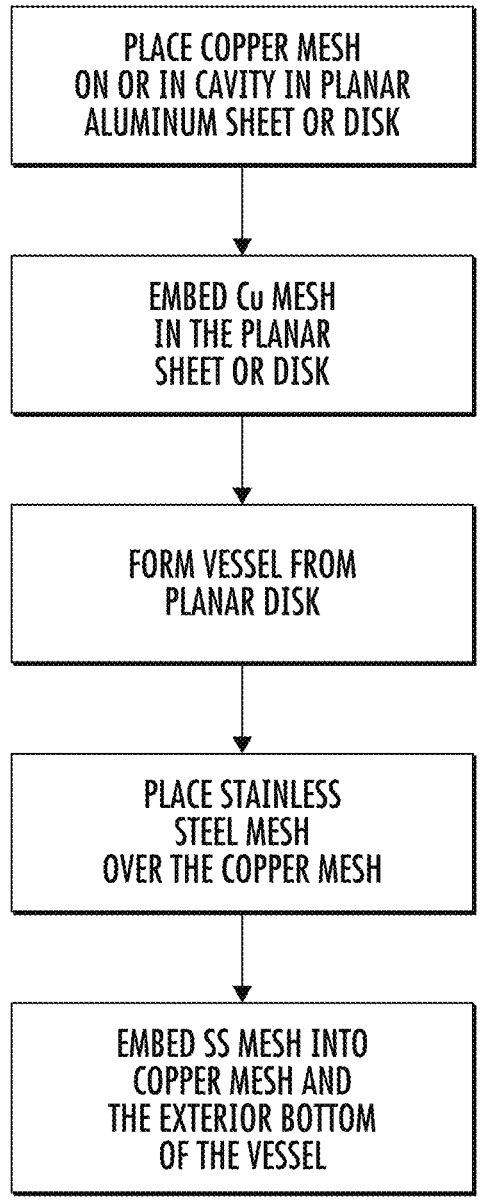
FIG. 8 is a flow chart of an alternative processes for forming the cookware article.
Figure 9A:
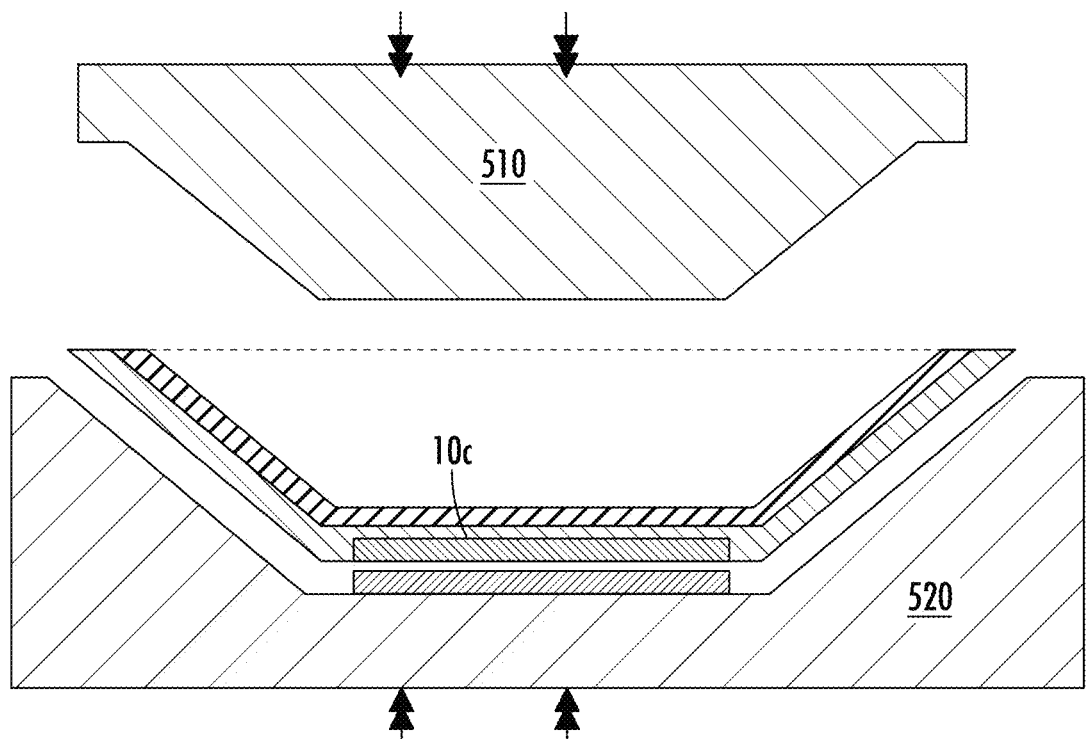
FIGS. 9A-9B schematically illustrate steps in the flow chart of FIG. 8.
Figure 9B:
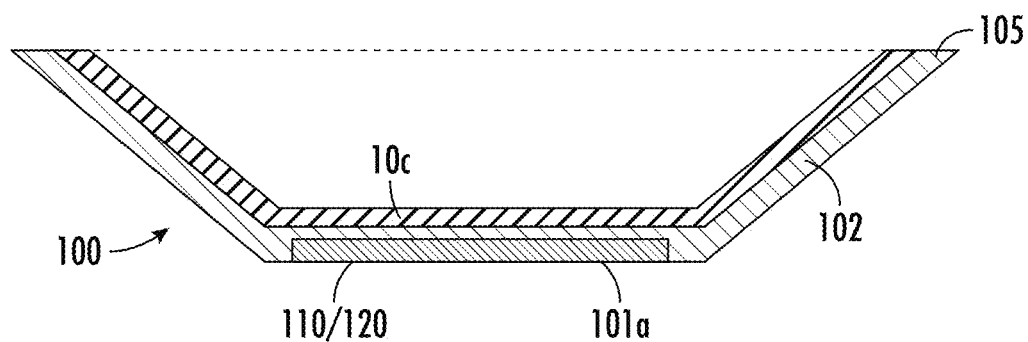

FIG. 8 is a flow chart of another alternative embodiment in which the copper mesh 110 is embedded at the stage of deep drawings as shown in FIG. 4A-5D, but the second or stainless steel mesh 120 is embedded as shown in FIG. 9A-9B, using similar forming dies 510 and 520. Only the second mesh 210 is placed between the lower forming die 520 and the mesh 110 that is already embed in the exterior bottom surface 101*a* of the cooking vessel 100.

The flow chart in FIG. 10A-C illustrates the process step to provide a cookware vessel 100 that has at least the exterior surface hard anodized after copper mesh 110 has been embedded in an aluminum cookware body 100. The second mesh of stainless steel 210 can be embedded after the step of hard anodizing. The process may deploys as alternatives the initial steps in FIG. 10A to embed the copper mesh 110 after the vessel 100' is formed, or the steps in FIG. 10B to embed the copper mesh in the planar sheet 10, and then form the vessel 100.

The vessel 400 can then be anodized by conventional methods of applying high current in an acidic bath, thus converting the outer aluminum skin of the surface to a hard and durable aluminum oxide layer. While the exposed portions of the copper mesh will be degraded to at least partially soluble oxides of copper during this anodizing process, the rate of degradation is relatively small compared to the time required to convert the aluminum to aluminum oxide during the anodizing process. Hence, if the copper mesh originally has a thickness of at least about 0.5 mm, and more preferably at least about 1 mm, only a small portion of the copper is oxidizing. The porous or soft copper oxides that remain after the anodizing step are readily removed by a subsequent polishing step. The step of polishing however does not remove a substantial amount of the aluminum oxide from the aluminum vessel. The stainless steel mesh can then penetrate the aluminum oxide that covers the exterior bottom surface 101*a*. The inside of the cookware vessel 100 is optionally covered or masked during this step, unless it is desirably to hard anodize the inside.

To the extent that the stainless steel mesh 210 is embedded after anodizing process, it is important that the portions of the grid material between the mesh openings 211 are relatively thin and spaced apart and that the mesh material 210 is considerably hard when compared to anodized aluminum.

Stainless steel mesh with a thickness of about 0.5 to 1 mm have been successfully embedded in anodized aluminum when the mesh openings 211 were from about 3 mm to about 4 mm wide, and the width of the metal between these openings was from about 0.5 mm to about 1 mm, and preferably about 0.75 mm.

As compared to other methods of rendering cookware compatible with induction heat source, additional embodiment corresponding to the process flow charts of FIGS. 3, 6, 8 and 10, a first mesh 110 is embedded in the bottom of the cookware vessel bottom exterior surface 101*a* by any of the above described methods, and then a second mesh 210 is embedded into the first mesh 110. When the second mesh 210 is harder and has a higher yield strength in compression than the first mesh 110, the first mesh 110 will undergo additional deformation which also deforms the bottom portion of the cookware vessel in the regions between the first mesh and the second mesh.

As copper and many alloys thereof are harder than aluminum alloys, the copper can be embedded as a first mesh 110 in an aluminum vessel. Then, or simultaneously a stainless steel mesh 210 can be embedded into the copper mesh and the portion of the cookware vessel between the copper mesh segments.

Figure 11A:
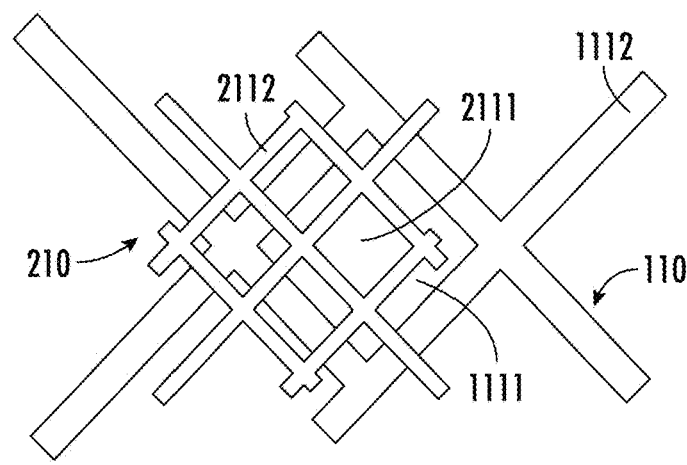
FIGS. 11A and 11B are plan views of additional alternative embodiments of the invention in which a first and second mesh are disposed for embedding in the cookware vessel or the planar metal sheet as the cookware vessel is formed.
Figure 11B:
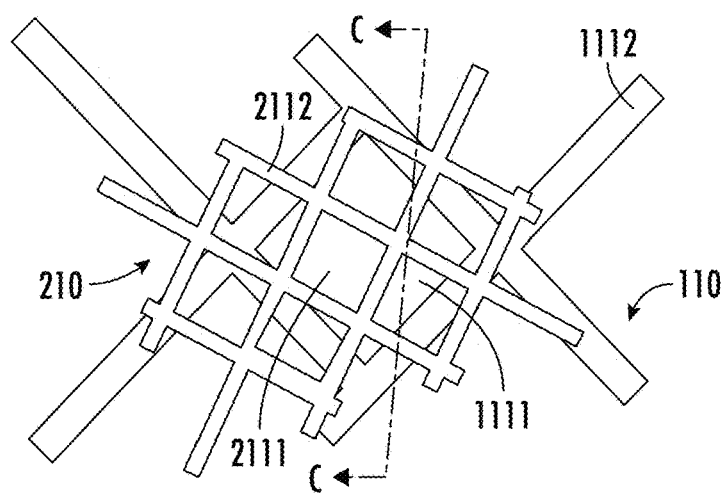

FIGS. 11A and 11B represent in a schematic plan view the first 110 and second mesh 210 being aligned over the exterior bottom surface 101*a* of the cookware vessel 100. The first mesh 110 on embedding may work harden the softer aluminum alloys that may be preferred for deep drawing, and reinforce the bottom of the vessel with the first or copper mesh 110.

The copper mesh 110, being deformed by the stainless steel mesh 210, work hardens as well as expands to further work harden the aluminum below exterior bottom surface 101*a*, as it is extruded through the openings in the mesh. In this step, the copper mesh 100 may also be work hardened to increase the strength and stiffness, by the deformation that results from embedding the harder stainless steel mesh 120 into it.

As copper and alloys of copper are generally more thermally conductive than aluminum and aluminum alloys as well as stainless steel, the intimate connection of the lateral mesh network of the copper with the stainless steel mesh, which is heated directly by eddy currents, is believed to enhance lateral heat transfer across the cookware bottom, while the aluminum cookware bottom provides the vertical heat transfer to the cooking surface on the vessel interior.

In a more preferred embodiment a copper mesh is embedded in the base, then a stainless steel mesh is embedded in the base to penetrate the portion of the base between the copper mesh, as well as into the copper mesh. It is more preferable to simultaneously embed the stainless steel and copper mesh for economic efficiency of eliminating process steps.

The deformation of the mesh and the work hardening of the base of the cookware vessel using different configurations of mesh are illustrated schematically in FIG. 11A-12B. In these Figures the first mesh is designates as 110 and has mesh openings 1111 between the grid material 1112. The second mesh is designated as 210 and has mesh openings 2111 between the grid material 2112. The shape of the mesh after embedding is designated as 1112' or 2112' in the section view of FIGS. 11C and 12C. In FIG. 11C, the deformed mesh is also designated with a trailing suffix a, b or c to designate the potential results of the embedding process.

FIGS. 11A and 11B illustrate the first 110 or weaker mesh, relative to the hardness and yield strength of the second mesh 210, as having wider grid material 1112 at the same aspect ratio of the grid material width the diameter of the openings. The mesh 110 and 210 can be aligned as in FIG. 11A or skewed as shown in FIG. 11B. By aligned we mean that the mesh segments are aligned to run in parallel directions. The alignment and spacing of each mesh relative to the other can be varied to create different ornamental patterns in the bottom exterior surface 101a of the cookware vessel 100.

Figure 11C:
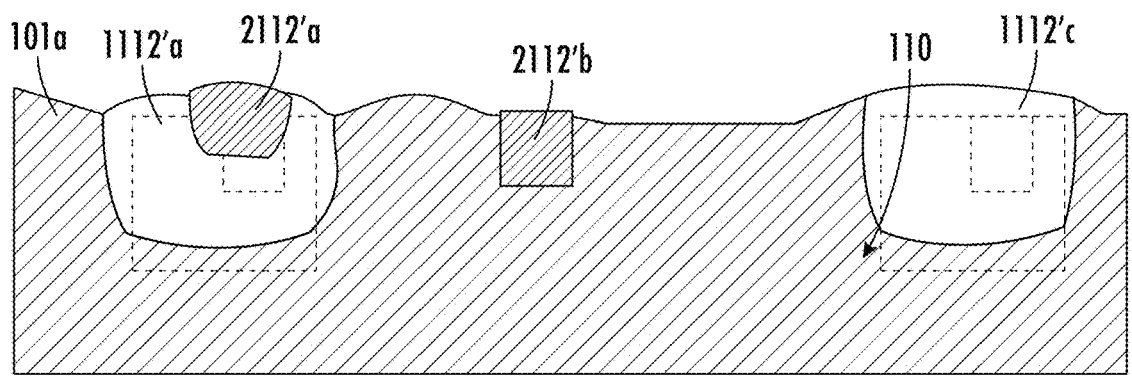
FIG. 11C is a schematic cross-sectional elevation of the resulting cookware from the embedding step after orienting the first and second mesh as shown in FIG. 11A or 11B.

It should be appreciated from FIG. 11A-C that in some regions of the cookware bottom or base 101 the first mesh 110 and second mesh 210 will be embedded directly in the exterior bottom surface 101a and the case for the first mesh 1112'c, not have the second mesh 2110 embedded into it. In other regions, the first mesh regions that are embedded 1112'a will have the second mesh 2112'a embedded onto in. These conditions are schematically illustrated in FIG. 10C in different regions in schematic section view. In the middle of FIG. 10C, the harder stainless steel or second mesh segments 2112'b is embed but does not itself deform. In far right the second and larger segments of the copper mesh 1112'c may deform slightly as they penetrate the aluminum base. These diagrams are intended to be schematic to illustrate the ranges of material deformation expected, which will differ for particular alloys and pretreatment conditions.

In the far left, the deformation of the copper mesh 1112'a is the greatest as it has been deformed first in penetrating the aluminum base 101, and then deformed a second time as the stainless steel mesh segment 2112'a penetrates from above. As the region of the aluminum substrate or base 101 penetrated by either mesh 2110 or 110 must be displaced, this occurs by the portion of the base over the holes 1111 and 2111 extruding upward, disrupting the surface shape of the base 101 at surface 101a. However, this deformation or upward extrusion between the harder and stronger mesh has a benefit in that it may work harden the aluminum base or bottom 101.

It should be understood that in the drawing process of forming vessel 100 from planar sheets 10 of metal it is preferred that the sheets are relatively ductile based on the alloy composition or heat treating so they yield and do not tear in deep drawing. While deep drawing deforms the side wall of the vessel, the bottom remains flat and it not as deformed in this process. Hence, its hardness may remain low and may be subject to more warping if not work hardened in some way or otherwise reinforced.

The consequence of the softer bottom in the cookware can become problematic when the metal is relatively thin or the cookware is unevenly cooled or heating, leading to warpage from the true shape of the forming dies.

Figure 12A:
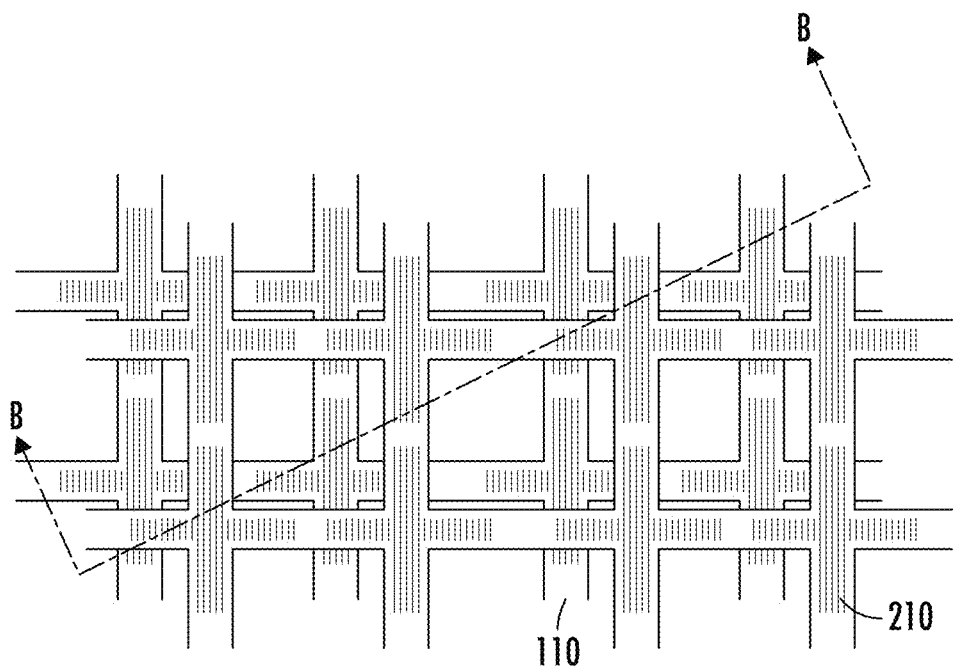
FIG. 12A is a schematic plan view of another embodiment of the invention in which a first and second mesh are disposed for embedding in the cookware vessel or the planar metal sheet as the cookware vessel is formed.
Figure 12B:
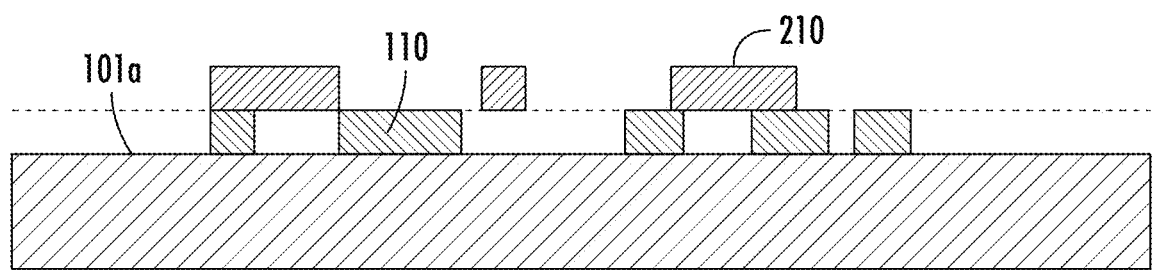
Figure 12C:
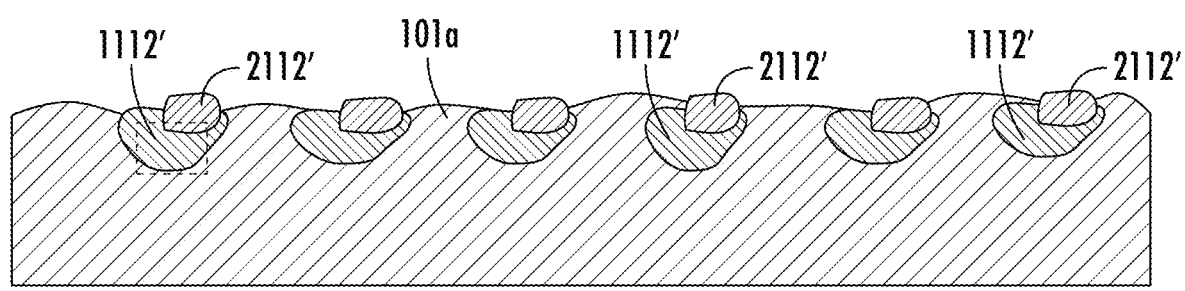
FIG. 12C is a schematic sectional view after the embedding process to show how each mesh may be deformed in the process.

FIG. 12A through C illustrate another embodiment that provides more surface deformation and work hardening the aluminum base 101. The first 110 mesh and second mesh 210 have about the same grid material width at about the same aspect ratio of the grid material width to the diameter of the openings 1111 and 2111. The meshes 110 and 120 are aligned, that is not skewed in orientation, but offset. This cause each segment of mesh 110 on the 4 sides of each opening to have a segment of the second mesh 210 crossing over in an orthogonal direction. Considering the section line B-B in FIG. 12 and the corresponding section view there are still region in which the mesh do not overlap. However, given the totally mesh free regions on the surface are smaller and spaced at a wider pitch, more extrusion and work hardening of aluminum may occur in these regions. FIG. 12C shows a section view of the most severe deformation in the overlap region in which the cooper mesh 110 is flattened as the stainless steel mesh 210 penetrates. The embedding process presses the extruding aluminum inward as it extrudes upward between the holes 1111 in the first mesh 110. The exterior bottom surface 101a becomes more distorted in the process as compared to smaller stainless steel mesh 210 as illustrated in FIG. 11C.

It should also be noted from FIG. 11C that the stainless steel mesh 210, though of a similar thickness to the copper mesh 100, may not completely pass through it, but rather creates a channel within it that is surrounded by the copper mesh 210 after it has undergone deformation. This immediate and intimate contact of at least parts of the stainless steel mesh 210 with the copper mesh 110 may lead to more direction heat transfer to the copper mesh 210 for lateral spreading of heat from the region of the induction coils to the edges of the cookware vessel 100 adjacent the sidewall 102.

It should be appreciated that the deformation of the substrate of base 101 and the copper or first mesh 110 work hardens a surface zone of the substrate or base 101 below exterior bottom surface 101a. In addition, with the stronger stainless steel mesh 120 embedded the copper mesh 110 is work hardened as well as it deforms in response to the harder steel mesh being deformed into it. This second deformation or the copper mesh 110 also provides additional work hardening of a surface zone of the substrate or base 101 below exterior bottom surface 101a. A cookware vessel 100 created by this process may be more resistant to thermal distortion of warping cause by shock cooling after being heated.

It should be appreciated that as both copper and stainless steel are heavier than aluminum and aluminum alloys, using a mesh reduces the weight of the cookware, making it easier for consumers to use larger cookware vessels. By the inventive co-embedding process, less stainless steel is used, but the work hardening of the aluminum may reduce the need to provide additional steel or copper for dimensional stability when the vessel is heated and expands at the bottom, or is rapidly and unevenly cooled that can lead to warpage of the of the cookware vessel 100.

Figure 13:
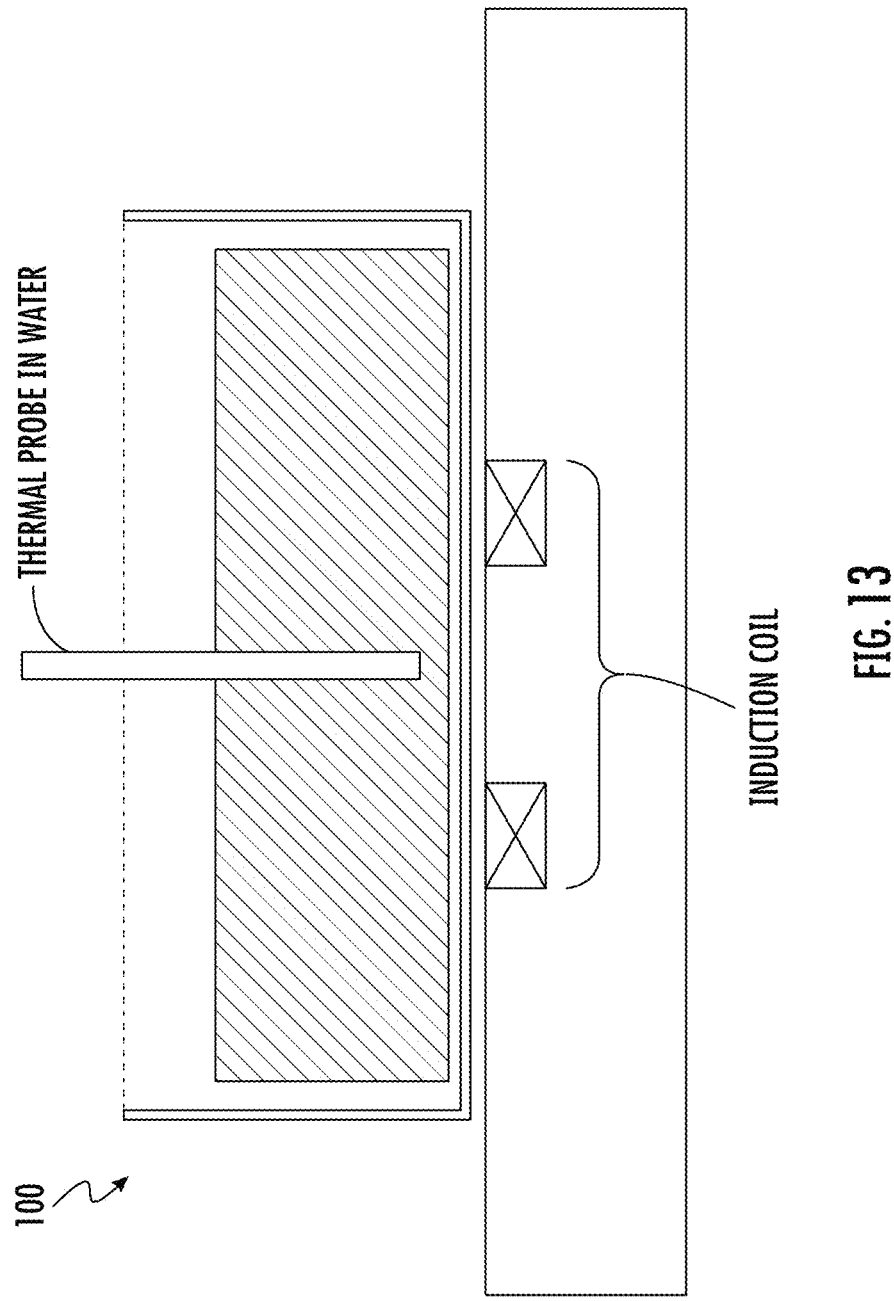
FIG. 13 is a schematic elevation view of a test method for determining the water heating rate in different embodiments of the invention.
Figure 14:
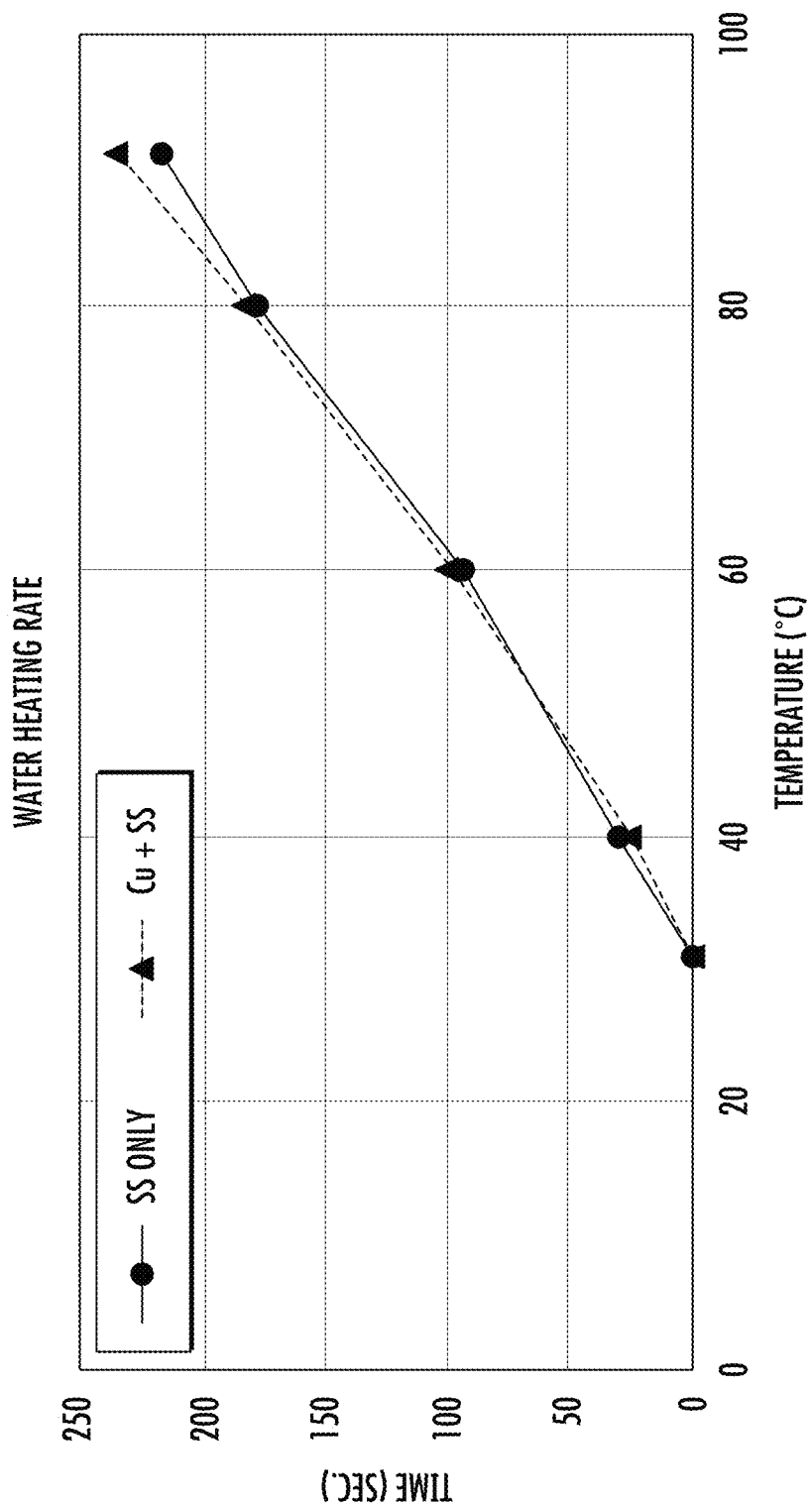
FIG. 14 is a chart plotting time of heating vs. temperature measures with the thermal probe in FIG. 13.

FIG. 14 is a graph plotting the rise in water temperature in the center of a vessel 100 as configured in FIG. 13. The water temperature (X-axis) rises almost as quickly with time (Y-axis) with copper and stainless steel mesh as compared to stainless steel mesh only. The copper mesh does not inhibit the ability of the ferromagnetic stainless steel mesh to receive energy from the induction coils and generate heat from eddy currents.

While the invention has been described in connection with a preferred embodiment, it is not intended to limit the scope of the invention to the particular form set forth, but on the contrary, it is intended to cover such alternatives, modifications, and equivalents as may be within the spirit and scope of the invention as defined by the appended claims.

We claim:

1. An article of cookware, comprising:
   a. a substantially horizontal bottom, having an interior bottom surface and an exterior bottom surface on the side opposing the interior bottom surface,
   b. a substantially upright sidewall extending upward from and encircling said bottom to form a fluid retaining interior region,
   c. a first metal mesh embedded in the exterior bottom surface, wherein the first metal mesh is copper,
   d. a second metal mesh embedded in the exterior bottom and at least portions of the first metal mesh, wherein the second metal mesh is stainless steel,
   e. wherein the exterior bottom surface consists essentially of exposed portions of the first metal mesh and the second metal mesh and the portion of the exterior bottom that extends through spaces within the first metal mesh and the second metal mesh, and the second metal mesh is at least partially embedded in the first metal mesh.

2. The article of cookware according to claim 1 wherein the article of cookware other than the first and second metal meshes is formed of one of aluminum and an alloy of aluminum and has one or more of an interior and exterior surface portions covered by an aluminum oxide layer.

3. The article of cookware according to claim 1 wherein the first metal mesh has a thickness of between 0.5 to 1 mm and the second metal mesh has a thickness that is less than the thickness of the first metal mesh.

4. The article of cookware according to claim 3 wherein one of the first and second metal meshes has openings that are from 3 mm to 4 mm wide.

5. The article of cookware according to claim 3 wherein one of the first and second metal meshes has a width of the metal between the openings that is from 0.5 mm to 1 mm.

6. The article of cookware according to claim 1 wherein one of the first and second metal meshes has a thickness of between 0.5 to 1 mm.

7. The article of cookware according to claim 6 wherein one of the first and second metal meshes has a width of the metal between the openings that is from 0.5 mm to 1 mm.

8. The article of cookware according to claim 1 wherein the second metal mesh is skewed in relation to the first metal mesh.

9. The article of cookware according to claim 1 wherein the second metal mesh is aligned with the first metal mesh, and wherein the second metal mesh is offset from the first metal mesh.

10. A process for forming a cookware vessel, the process comprising the steps of:
    a. providing an aluminum disk,
    b. providing a stainless steel mesh and a copper mesh,
    c. deep drawing the aluminum disk to form a vessel capable of retaining a fluid, the vessel having an interior bottom surface and an exterior bottom surface,
    d. embedding the copper mesh in a portion of one of the aluminum disk and the vessel to at least partially extend into the interior bottom surface of the vessel,
    e. embedding the stainless steel mesh into the copper mesh and one of portions of the aluminum disk and the exterior bottom portions of the vessel that are between holes in the copper mesh.

11. The process for forming a cookware vessel according to claim 10 wherein the copper mesh and stainless steel mesh are simultaneously embedded in the one of the exterior bottom surface of the vessel and a central portion of the aluminum disk.

12. The process for forming a cookware vessel according to claim 10 wherein the stainless steel mesh at least partially deforms portions of the copper mesh in the step of embedding.

* * * * *